Dec. 19, 1922.
1,439,298.
P. J. DEHETRE.
FLEXIBLE ROTARY TRACK LAYER.
FILED MAR. 5, 1919.
2 SHEETS—SHEET 1.
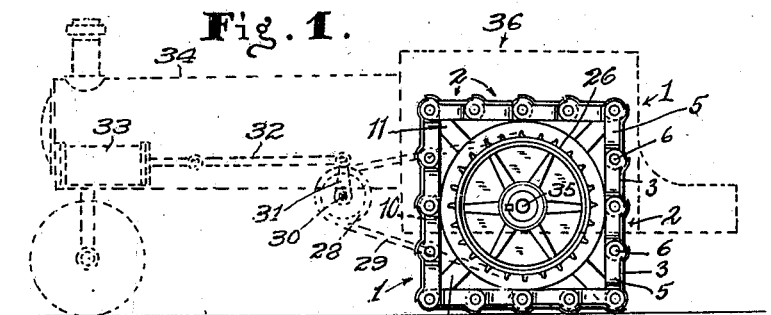
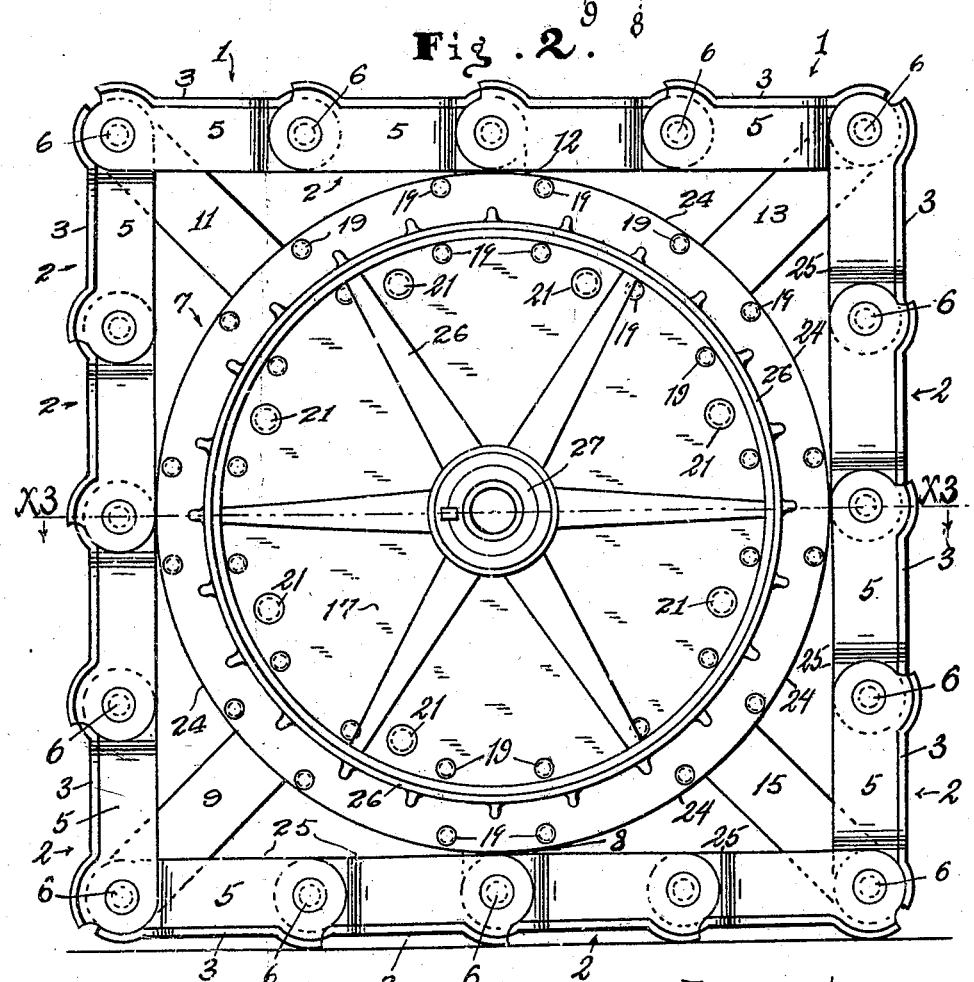
Witness:
W. M. Gentle
Inventor.
Philip Jerome Dehetre
by James R. Townsend
his atty.

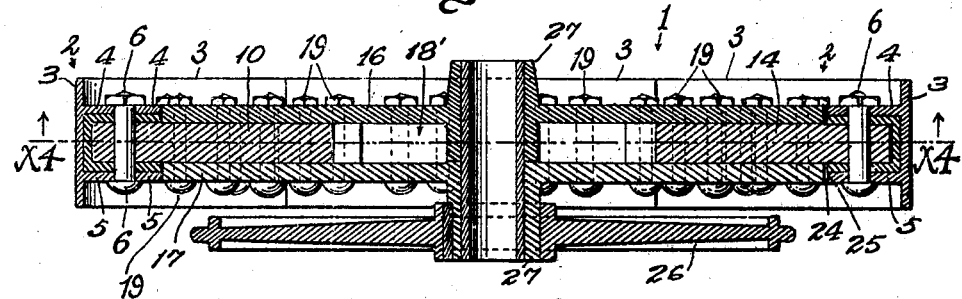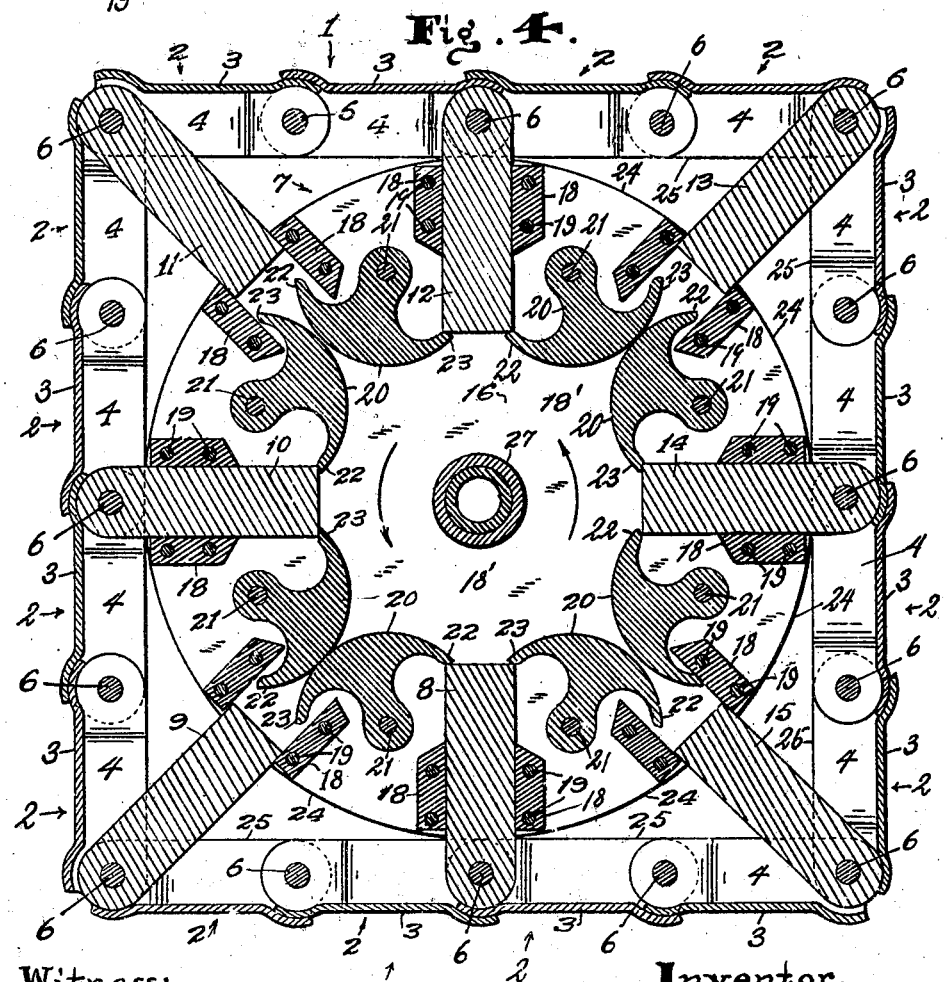

Patented Dec. 19, 1922.

1,439,298

UNITED STATES PATENT OFFICE.

PHILIP JEROME DEHETRE, OF HUNTINGTON BEACH, CALIFORNIA.

FLEXIBLE ROTARY TRACK LAYER.

Application filed March 5, 1919. Serial No. 280,844.

*To all whom it may concern:*

Be it known that I, PHILIP JEROME DEHETRE, a citizen of the United States, and resident of Huntington Beach, in the county of Orange and State of California, have invented new and useful Improvements in a Flexible Rotary Track Layer, of which the following is a specification.

This invention relates to track laying apparatus for tractor wheels, and consists of the new and useful features of construction, arrangement and combination of parts, the purpose of which will be apparent from a consideration of the preferred form of structure herein shown, described and claimed.

The principal object of the invention is to provide in a practical way a tractor wheel with an endless track which it may carry with it and lay down in its tread and in front and rear.

Another feature of the invention is shown in the broad tread and support of the wheel furnished by the endless track.

Another feature is shown in the novel means employed for moving the endless track to always keep it in advance and in the rear of said wheel.

Another feature is shown in the substantial structure of both the tractor wheel and the endless track with which it is associated.

Other objects, advantages and features of invention may appear in the accompanying drawings, the subjoined detail description and the appended claims.

The accompanying drawings illustrate the invention.

Figure 1 is a side elevation of a tractor wheel within the endless track, said wheel being associated with a tractor, the latter shown in dotted lines.

Fig. 2 is a similar view of the tractor wheel and endless track, removed from the tractor and drawn to a larger scale.

Fig. 3 is a section taken on the line $x^3$—$x^3$ Fig. 2 showing the interior structure of the wheel and endless track.

Fig. 4 is a section taken on the line $x^4$—$x^4$ Fig. 3 showing the interior of the wheel and the means for moving the endless track.

In detail, the endless track 1 is made of a plurality of links 2 which are formed with the broad tread plate or portion 3 on which are secured the side plates 4 and 5 which preferably have one edge of each integral with the tread plate 3.

The plates 4 and 5 each have one end bent inward to fit between the opposite ends or the sides 4 and 5 of another link, the telescoping ends being pivotally secured together by means of the bolts 6, such joining of the links 2 with the tread construction forming the endless track 1.

The base plates 3 are considerably wider than the distance between the sides 4 and 5 so that they form a very much wider tread than the tractor wheel 7.

The endless track 1 is preferably formed with sixteen links 2 which are joined as before stated; and pivotally connected to every other link is one end of one of the bars 8, 9, 10, 11, 12, 13, 14 and 15, and the pivoted ends of these bars are located between the side plates 4 and 5 and pivoted on the bolts 6 which bolts also pivotally secure the links 2 together.

The tractor wheel 7 is formed of the sides 16 and 17, and these sides are spaced apart by a plurality of blocks 18 forming radial guides, and the sides and blocks are held together by the bolts 19.

The sides 16 and 17 and the blocks 18 which latter are positioned in pairs, form guides and bearings for the free ends of the bars 8, 9, 10, 11, 12, 13, 14 and 15 so that these bars can slide toward or away from the center of the tractor wheel 7. The spacing apart of the sides 16 and 17 by the blocks 18 forms the compartment 18' in which a plurality of oscillating means in the form of pawls 20 are pivoted on the bolts 21 and have the oppositely extending fingers 22 and 23 the points of which are the same distance radially from the center of the pivots 21, the body of the pawls being the fragmentary part of a disc.

The pawls 20 are so positioned that the fingers 22 and 23 thereof are adapted to engage the inner ends of the bars 8 to 15 inclusive. The pawl between the bars 8 and 9 has its finger 22 engaging the end of the bar 8 and its finger 23 in position to engage the bar 9 when the wheel 7 has moved to a position which will contact these parts.

As the wheel advances to the left in Fig. 4, the oscillating means 20 are brought into contact with the end of the bar 9 which is held stationary relative to the ground, and the oscillators are thereby oscillated upon the pivots 21, and operate to force the succeeding bar 10 out in due time to take the position indicated at 9.

As the fingers 22 and 23 and the wheel 7 continue to move, the pawls 20 will be moved to bring an outward pressure on the ends of the bars 8 and 10. As the bar 9 resists the oscillators, they transmit pressure to extend the bars 8 and 10 and the bars 11, 13 and 15 will move in toward the center of the wheel while the other bars 8, 10, 12 and 14 move outwardly.

This operation may vary in actual practice under the action of gravity and other forces, the principle, however, being that the advance of the wheel toward the ground, actuates the bar head of the bar 10 to extend it to reach the ground, and also actuates the bar 8 to retain said bar 8 on the ground until a succeeding operation moves said bar 8 in toward the center of the wheel, thus causing an operative relation of the parts to be successively brought about as the wheel advances.

It is to be understood that this relationship of parts and their movement applies only when the weight of the wheel 7 is directly over the bar 8 and the wheel traveling toward the bar 9; for as soon as the wheel is directly over the bar 9 and moving toward the bar 10, another position of the parts is accomplished. The function of the pawls 20 is to move the bars 8 to 15 inclusive outward as the wheel 7 rolls over the endless track 1.

As shown in the drawing, the sides of the wheel 7 have their periphery 24 traveling on the inner edges 25 of the parallel plates 4 and 5 of the links 2; and as the wheel rolls over these edges the pawls are moved to lay the endless track in advance of the wheel and to pick it up in the rear of the wheel.

Assuming that the wheel is moving toward the bar 9, the latter will move the pawls on each side of it to keep down the bar 8 and to force outward the bar 10 so that when the wheel 7 is directly over the bar 9 the links 2 between the bars 8 and 10 will be flat on the ground forming thereby a track for the wheel.

Any means may be employed to drive the tractor wheel. That shown herein consists of a sprocket wheel 26 which is keyed to the hub 27 of the wheel 7; and, as shown in Fig. 1 the sprocket wheel 26 may be connected to a sprocket wheel 28 by a chain 29, the sprocket wheel 28 and chain being indicated by a dotted line.

As also indicated by dotted lines, the sprocket wheel 28 may be located on the shaft 30 which is actuated by the crank 31, the rod 32 and piston 33 of the engine 34, which latter is only shown in outline.

In operation, the wheels 7 are mounted on the axle 35 of a tractor 36, and encased by the endless chain or track 1; then by means of the sprocket drive the tractor is driven forward or backward, and as it moves in either direction the pawls 20 engage the ends of the bars 8 to 15 and move them out to form a flat track underneath the tractor wheels; so that practically all the time one fourth of the endless track is lying flat on the ground and underneath the tractor wheels.

While this invention has been specially described as adapted to tractor wheels, it is not intended that it shall be limited to that use, as it can be applied to the wheels of various vehicles.

This invention also admits of modifications and changes without departing from the scope and spirit of the invention.

I claim:

1. The combination with links pivoted together to form an endless chain of a wheel adapted to roll upon said links inside said chain and provided with radial guide ways; bars pivotally connected to said links at said pivotal connections; oscillating means carried by the wheel and arranged to engage one of said bars when the same is held stationary, and to transmit motion of the wheel to an adjacent bar for the purpose of forcing said adjacent bar outwardly for the purpose set forth.

2. In a track laying apparatus, links pivoted together to form an endless chain; a wheel treading on said chain; bars pivotally connected to said chain at certain of said pivotal connections; and means contacting with one of said bars for moving certain of said other bars to keep a portion of said track flattened.

3. In a track laying apparatus, an endless track; comprising links and bolts pivotally connected to said links; bars having one end pivotally connected to said bolts; a wheel treading said endless track; bearings in said wheel in which said bars are slidably mounted; and means contacting with one of said bars for moving said other bars to flatten said links under said wheel.

4. In a track laying apparatus, an endless track; comprising links; bars having one end pivotally connected to said links; a wheel treading said endless track; bearings in said wheel in which said bars are slidably mounted; pawls within said wheel for engaging the other ends of said bars, said pawls adapted to move said bars to flatten a portion of the endless track under the wheel as the latter moves.

5. In a track laying apparatus, a plurality of links pivotally connected and each link having a large base plate; a plurality of bars having one end pivotally connected to every other one of said links; a wheel having sides spaced apart and adapted to tread said links; and provided with radial guide ways in which the other ends of said bars are slidably mounted; and means within said wheel for moving said bars to flatten a portion of said links under said wheel as the wheel is moved.

6. In a track laying apparatus, a plurality of pivotally connected links; a plurality of bars having one end pivotally connected to every other one of said connections pivotally connecting said links; a wheel having sides spaced apart and adapted to tread said links; bearings in said wheel in which the other ends of said bars are slidably mounted; and means within said wheel for moving said bars to flatten a portion of said links under said wheel as the wheel is moved.

7. In a track laying apparatus, an endless track; comprising links having a large base plate and side plates integral therewith; bars pivotally connected to said links; a wheel having sides spaced apart and adapted to tread the inner edge of said side plates; bearings in said wheel in which the other ends of said bars are slidably mounted; and means within said wheel contacting with one of said bars for moving adjacent bars for the purpose set forth.

8. In a track laying apparatus, an endless track, comprising links and bolts pivotally connecting said links, bars pivotally connected to every other one of said bolts, a wheel treading said track, and means whereby, as one of said bars is moved inwardly the adjacent bars are moved outwardly for the purpose set forth.

9. In a track laying apparatus, a plurality of pivotally connected links; a plurality of bars having one end pivotally connected to every other one of said connections pivotally connecting said links; a wheel having sides spaced apart and adapted to tread said links; and provided with radial guide ways in which the other ends of said bars are slidably mounted; and means within said wheel for moving said bars to flatten a portion of said links under said wheel as the wheel is moved.

In testimony whereof, I have hereunto set my hand at Los Angeles, California, this 18th day of February, 1919.

PHILIP JEROME DEHETRE.

Witness:
EDYTHEMAE BROWN.